(12) United States Patent
Matsudaira

(10) Patent No.: US 9,944,032 B2
(45) Date of Patent: Apr. 17, 2018

(54) METHOD FOR MANUFACTURING ENDLESS BELT AND ENDLESS BELT

(71) Applicant: BRIDGESTONE CORPORATION, Tokyo (JP)

(72) Inventor: Nobuhide Matsudaira, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 316 days.

(21) Appl. No.: 14/646,967

(22) PCT Filed: Nov. 12, 2013

(86) PCT No.: PCT/JP2013/006662
§ 371 (c)(1),
(2) Date: May 22, 2015

(87) PCT Pub. No.: WO2014/080593
PCT Pub. Date: May 30, 2014

(65) Prior Publication Data
US 2015/0298407 A1 Oct. 22, 2015

(30) Foreign Application Priority Data

Nov. 26, 2012 (JP) ................................. 2012-257794

(51) Int. Cl.
*B29C 65/50* (2006.01)
*B29D 29/00* (2006.01)
(Continued)

(52) U.S. Cl.
CPC ............ *B29D 29/00* (2013.01); *B29C 65/483* (2013.01); *B29C 65/505* (2013.01);
(Continued)

(58) Field of Classification Search
CPC . B29C 65/483; B29C 65/4835; B29C 65/505; B29C 66/02245; B29C 66/128;
(Continued)

(56) References Cited

U.S. PATENT DOCUMENTS 2,259,161 A * 10/1941 Hansen ................. B29D 29/00
156/164
3,693,218 A 9/1972 Jaubert et al.
(Continued)

FOREIGN PATENT DOCUMENTS

| CN | 101780876 A | 7/2010 |
|---|---|---|
| CN | 102506123 A | 6/2012 |

(Continued)

OTHER PUBLICATIONS

Communication dated Feb. 3, 2016, from the State Intellectual Property Office of the People's Republic of China in counterpart application No. 201380061697.7.
(Continued)

*Primary Examiner* — Michael A Tolin
(74) *Attorney, Agent, or Firm* — Sughrue Mion, PLLC

(57) ABSTRACT

A method for manufacturing an endless belt includes: coating a depression that is formed between both belt longitudinal ends of surface rubber of a belt and to which an adhesion processing material is attached, with at least one layer of unvulcanized rubber sheet; and vulcanizing the unvulcanized rubber sheet to bond the unvulcanized rubber sheet to the surface rubber, in which A is less than B, where A is a belt longitudinal distance between a belt longitudinal edge of an interface of the unvulcanized rubber sheet and the adhesion processing material and a belt longitudinal edge of the depression, and B is a belt longitudinal distance between
(Continued)

a belt longitudinal edge of an area to which the adhesion processing material is attached and the belt longitudinal edge of the depression.

5 Claims, 3 Drawing Sheets

(51) Int. Cl.
  *B65G 15/32*  (2006.01)
  *F16G 3/10*  (2006.01)
  *B29C 65/48*  (2006.01)
  *B29C 65/00*  (2006.01)
  *B29L 29/00*  (2006.01)
  *B29K 21/00*  (2006.01)
  *B29K 105/24*  (2006.01)

(52) U.S. Cl.
  CPC .. *B29C 66/02245* (2013.01); *B29C 66/12822* (2013.01); *B29C 66/12842* (2013.01); *B29C 66/14* (2013.01); *B29C 66/4322* (2013.01); *B29C 66/4324* (2013.01); *B29C 66/71* (2013.01); *B29C 66/723* (2013.01); *B29C 66/73756* (2013.01); *B29C 66/8362* (2013.01); *B29C 66/861* (2013.01); *F16G 3/10* (2013.01); *B29C 66/73161* (2013.01); *B29K 2021/00* (2013.01); *B29K 2105/24* (2013.01); *B29L 2029/00* (2013.01)

(58) Field of Classification Search
  CPC .......... B29C 66/1282; B29C 66/12821; B29C 66/12822; B29C 66/1284; B29C 66/12841; B29C 66/12842; B29C 66/14; B29C 66/4322; B29C 66/4324; B29C 66/723; B29C 66/73756; B29C 66/8362; B29C 66/861; B29D 29/00; B29D 29/06; B29L 2029/00; B29L 2031/709; B29L 2031/7092; B65G 15/00; B65G 15/30; B65G 15/32; B65G 15/34; F16G 3/10
  See application file for complete search history.

(56) References Cited

U.S. PATENT DOCUMENTS 4,050,322 A  9/1977 Moring
2010/0263748 A1* 10/2010 Young ................... B29C 53/04
                137/561 R

FOREIGN PATENT DOCUMENTS

| CN | 202499476 U | | 10/2012 |
|---|---|---|---|
| JP | 58170947 A | | 10/1983 |
| JP | 60-65936 A | | 4/1985 |
| JP | 1-148328 U | | 10/1989 |
| JP | 9-239845 A | | 9/1997 |
| JP | 2000-344318 A | | 12/2000 |
| JP | 2001-301937 A | | 10/2001 |
| JP | 2006-176225 A | * | 7/2006 |

OTHER PUBLICATIONS

Communication dated Oct. 1, 2015 from the Australian Patent Office issued in corresponding application No. 2013349192.
International Search Report for PCT/JP2013/006662 dated Feb. 10, 2014 [PCT/ISA/210].

* cited by examiner

BELT LONGITUDINAL DIRECTION

BELT LONGITUDINAL DIRECTION

METHOD FOR MANUFACTURING ENDLESS BELT AND ENDLESS BELT

CROSS REFERENCE TO RELATED APPLICATIONS

This application is a National Stage of International Application No. PCT/JP2013/006662, filed on Nov. 12, 2013, which claims priority from Japanese Patent Application No. 2012-257794, filed on Nov. 26, 2012, the contents of all of which are incorporated herein by reference in their entirety.

TECHNICAL FIELD

The disclosure relates to a method for manufacturing an endless belt and an endless belt.

BACKGROUND

Endless processing of a belt by vulcanization bonding is widely known.

Typical endless processing is as follows. First, a part of surface rubber 204 at both longitudinal ends 200a and 200b of a belt is cut and removed, and then core body canvas at both ends 200a and 200b is peeled off stepwise to form steps, as illustrated in FIG. 2A. Next, an adhesion processing material 202 such as rubber cement and unvulcanized adhesive rubber is attached to step surfaces 201, and the ends 200a and 200b are overlapped so that a depression 203 is formed between the belt longitudinal ends of the surface rubber of the belt, as illustrated in FIG. 2B. After this, the depression 203 to which the adhesion processing material 202 is attached is coated with at least one layer of unvulcanized rubber sheet, e.g. two layers of unvulcanized rubber sheets 210a and 210b, and the upper surface of the upper unvulcanized rubber sheet 210b is pressed with a roller 300 to pressure-join the unvulcanized rubber sheets 210a and 210b, the adhesion processing material 202, and the surface rubber 204 including the depression 203, as illustrated in FIG. 2C. The overlapped belt longitudinal ends including the depression 203 are then heated while being pressed from above and below, as a result of which the unvulcanized rubber sheets 210a and 210b are vulcanized to bond to the adjacent rubber. The endless belt can be manufactured in this way.

Here, the attachability between the adhesion processing material 202 and the vulcanized surface rubber 204 of the belt is typically not high. There is accordingly a possibility that, even when the upper surface of the upper unvulcanized rubber sheet 210b is pressed with the roller 300 as illustrated in FIG. 2C, the unvulcanized rubber sheets 210a and 210b and the adhesion processing material 202 peel away from the surface rubber 204 before vulcanization and as a result the work efficiency of the vulcanization step decreases significantly or the contamination with foreign substances occurs.

The following operation may also be performed after the depression 203 is coated with the unvulcanized rubber sheets 210a and 210b. The part of the unvulcanized rubber sheets 210a and 210b disposed on the surface rubber 204 is cut and removed so that the surface of the unvulcanized rubber sheets 210a and 210b is substantially level with the surface of the surface rubber 204, and then the unvulcanized rubber sheets 210a and 210b are vulcanized, as illustrated in FIG. 3A. Further, to improve the external appearance, both belt longitudinal ends of the vulcanized rubber sheets are buffed to make the edges 203e of the depression visible, as illustrated in FIG. 3B. In such a case, however, there is a possibility that the adhesion processing material 202 degrades as a result of being exposed at the edges 203e of the depression, causing the belt to be cracked at the edges 203e, and the vulcanized rubber sheets 210a and 210b to completely peel away from the exposed part of the interface of the vulcanized rubber sheets indicated by the arrows in the drawing.

It could therefore be helpful to provide a method for manufacturing an endless belt by which the work efficiency of endless processing can be enhanced and a highly durable endless belt can be obtained, and a highly durable endless belt.

SUMMARY

In the disclosed a method for manufacturing an endless belt, A is less than B, where A is a belt longitudinal distance between a belt longitudinal edge of an interface of the unvulcanized rubber sheet and the adhesion processing material and a belt longitudinal edge of the depression, and B is a belt longitudinal distance between a belt longitudinal edge of an area to which the adhesion processing material is attached and the belt longitudinal edge of the depression.

In this specification, the "surface rubber" means rubber that is layered to form the outer surface of the belt.

The dimensions such as the belt longitudinal distance A between the belt longitudinal edge of the belt interface of the unvulcanized rubber sheet and the adhesion processing material and the belt longitudinal edge of the depression are the dimensions before the unvulcanized rubber sheet and the like are vulcanized. To "attach" the adhesion processing material includes placing the adhesion processing material in the area by application, spray, or the like.

It is thus possible to provide a method for manufacturing an endless belt by which the work efficiency of endless processing can be enhanced and a highly durable endless belt can be obtained, and provide a highly durable endless belt.

DETAILED DESCRIPTION

The following describes an embodiment of the disclosed method for manufacturing endless belt with reference to drawings.

Figure 1A:
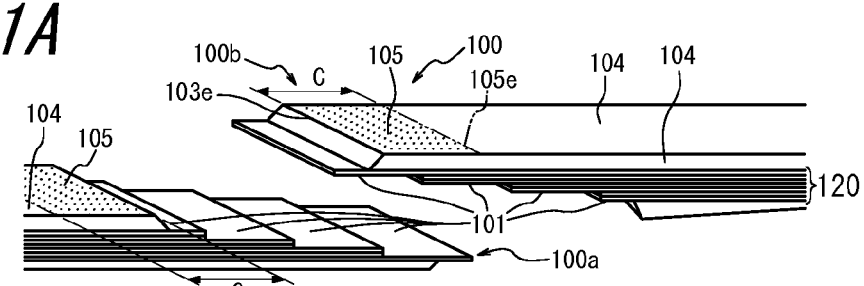
FIG. 1A to FIG. 1E are perspective views illustrating an embodiment of a method for manufacturing an endless belt.

In this embodiment, a belt 100 having both ends is manufactured by coating a plurality of layers of canvas 120 with surface rubber 104. After a part of the surface rubber 104 at both longitudinal ends 100a and 100b of the belt 100 is removed, core body canvas at both ends 100a and 100b is peeled off stepwise to form step surfaces 101 in a step processing step, as illustrated in FIG. 1A. Although this embodiment describes the case where the ends of one belt are bonded to manufacture an endless belt, the method may apply to the case where the ends of a plurality of belts are bonded to manufacture an endless belt.

Before or after the step processing step, adhesion improvement processing is performed on an area 105 of the surface rubber 104 in an adhesion improvement processing step, as illustrated in FIG. 1A. In this embodiment, the adhesion improvement processing is performed by buffing the outer surface of the surface rubber by a grinder or the like to roughen the rubber surface. This not only has the effect of cleaning the rubber surface and the anchoring effect by surface roughening, but also activates the rubber molecules.

In this specification, the "adhesion improvement processing" performed on the surface rubber means processing that improves the adhesion to an unvulcanized rubber sheet and adhesion processing material to be bonded to the surface rubber, such as buffing the outer surface of the surface rubber or cutting the surface rubber.

Figure 1B:
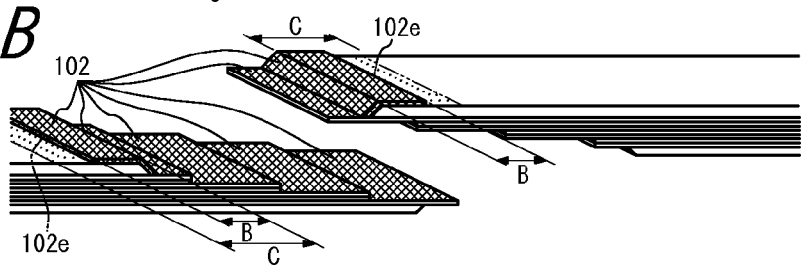

Next, an adhesion processing material 102 is attached to the step surfaces 101 and the belt longitudinal ends of the surface rubber 104 in an adhesion processing material attachment step, as illustrated in FIG. 1B. Let B be the belt longitudinal distance (hereafter also referred to as the adhesive attachment area length) between the belt longitudinal edge 102e of the area to which the adhesion processing material 102 is attached and the belt longitudinal edge 103e of the below-mentioned depression. The adhesion processing material 102 is attached so that the adhesive attachment area length B is greater than the longitudinal distance (hereafter also referred to as the unvulcanized rubber sheet length) A between the belt longitudinal edge 110e of the interface of the below-mentioned unvulcanized rubber sheet 110a and the adhesion processing material 102 and the belt longitudinal edge 103e of the depression. Here, the adhesion processing material may be attached to only one side of the overlapped step surfaces 101.

Examples of the adhesion processing material 102 include: rubber cement which has high adhesion and is obtained by dissolving unvulcanized adhesive rubber in an organic solvent, and unvulcanized adhesive rubber (rubber that does not have a sufficient adhesive force unless used together with rubber cement), the rubber cement and the unvulcanized adhesive rubber being conventionally and widely used; and unvulcanized pressure sensitive adhesive rubber that has a sufficient adhesive force even when used alone (even when not used together with rubber cement). The unvulcanized pressure sensitive adhesive rubber is easier to use. In the case of using the unvulcanized pressure sensitive adhesive rubber, the environmental load can be lessened by not using rubber cement or using a reduced amount of rubber cement. The unvulcanized adhesive rubber or the unvulcanized pressure sensitive adhesive rubber may be used (attached) as a single layer or two or more layers. In the case where two or more layers of the unvulcanized adhesive rubber or unvulcanized pressure sensitive adhesive rubber are formed, the cushioning property of the inclined surface from the bottom to belt longitudinal edge 103e of the depression where the unvulcanized rubber sheet is particularly easy to peel may be enhanced. For example, the adhesive force of the unvulcanized pressure sensitive adhesive rubber is 1.0 N/mm or more, and preferably 1.5 N/mm or more. Note that the adhesive force is measured in accordance with JIS K 6322.

By using either rubber cement and unvulcanized adhesive rubber or unvulcanized pressure sensitive adhesive rubber as the adhesion processing material 102, the adhesion between the members before vulcanization can be improved, and also both longitudinal ends of the belt can be firmly bonded to each other by vulcanization.

Figure 1C:
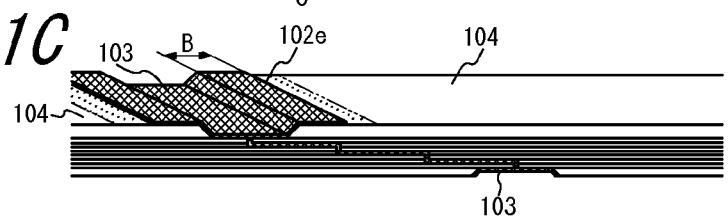

After the above-mentioned adhesion processing material attachment step, both longitudinal ends 100a and 100b of the belt are overlapped so that a depression 103 is formed between the belt longitudinal ends of the surface rubber 104 in an overlapping step, as illustrated in FIG. 1C.

Although this embodiment describes the case where the adhesion processing material has already been attached to the depression when the longitudinal ends of the belt are overlapped to form the depression, the adhesion processing material may also be attached after the depression is formed. For example, after the adhesion processing material 102 is attached only to the belt longitudinal end 100a that has the step surfaces 101 on the front side of the belt, the overlapping step is performed to form the depression 103, and then the adhesion processing material 102 is attached to the surface rubber 104 of the belt longitudinal end 100b.

Figure 1D:
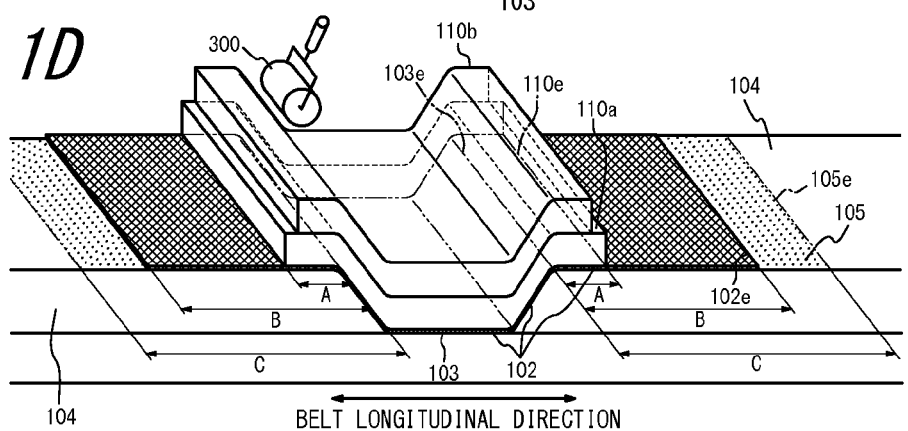

In an unvulcanized rubber sheet coating step which follows, the depression 103 between the longitudinal ends of the belt to which the adhesion processing material 102 is attached is coated with at least one layer of unvulcanized rubber sheet, e.g. two layers 110a and 110b of unvulcanized rubber sheets in this embodiment, as illustrated in FIG. 1D.

The adhesion processing material is typically low in weather resistance, and so tends to degrade when exposed on the outer surface of the belt. Especially when the adhesion processing material is exposed at the edges 103e of the depression, cracking tends to occur at the edges, which may cause the unvulcanized rubber sheets to completely peel away. Accordingly, the unvulcanized rubber sheets 110a and 110b are arranged so as to completely cover the edges 103e of the depression.

The unvulcanized rubber sheets 110a and 110b are then cut so that the unvulcanized rubber sheet width A is less than the adhesive attachment area length B. By attaching the adhesion processing material 102 to the wider area than the area where the unvulcanized rubber sheets are arranged in this way, the unvulcanized rubber sheets and the adhesion processing material are kept from peeling away from the surface rubber 104 before vulcanization, thus enhancing the work efficiency of the endless processing. This enables a highly durable endless belt to be obtained by vulcanization bonding.

Figure 1E:
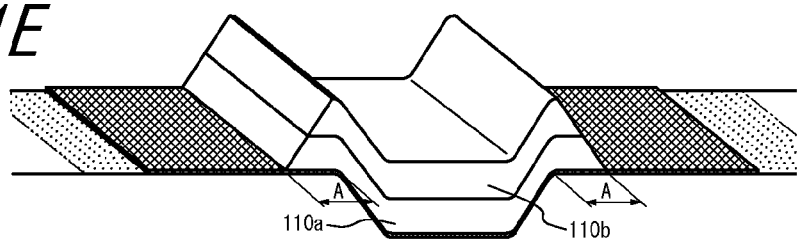
Figure 2A:
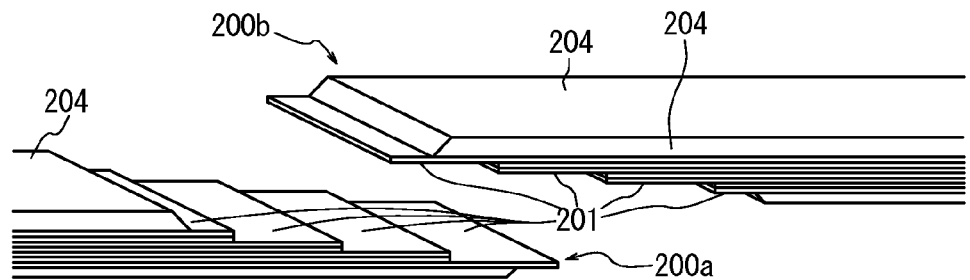
FIG. 2A to FIG. 2C are perspective views illustrating a conventional method for manufacturing an endless belt.
Figure 2B:
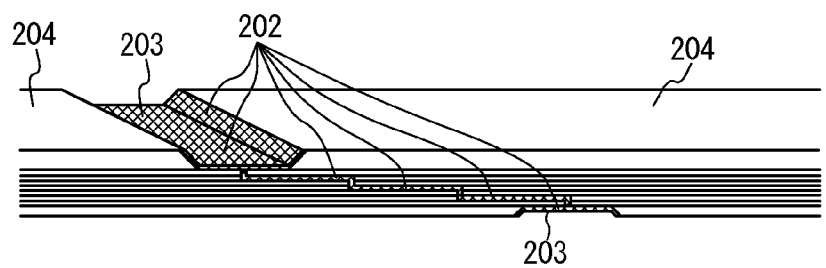
Figure 2C:
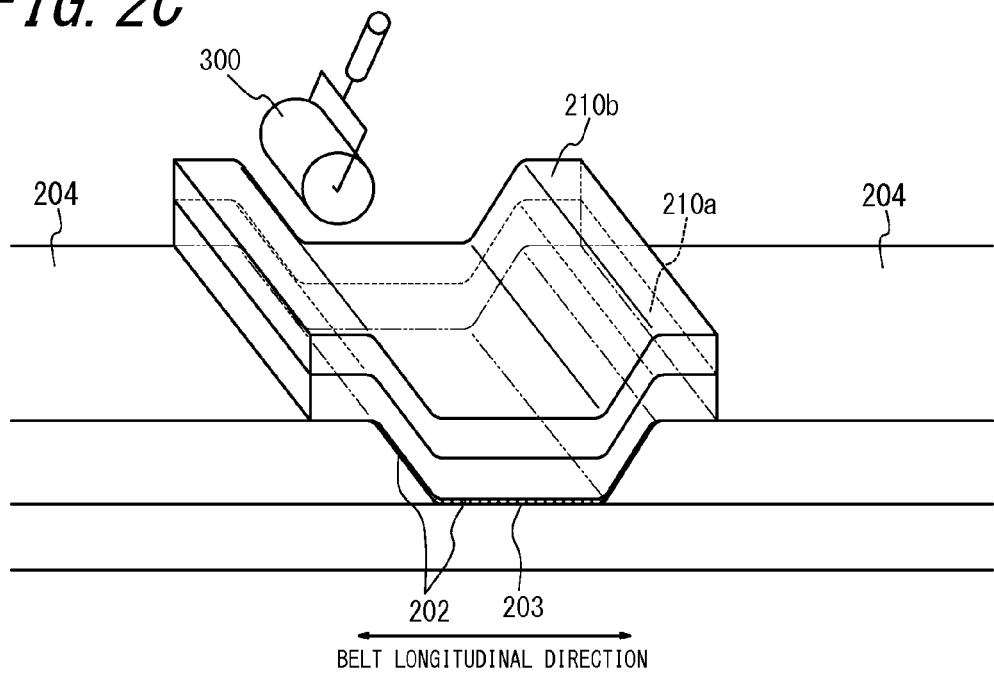
Figure 3A:
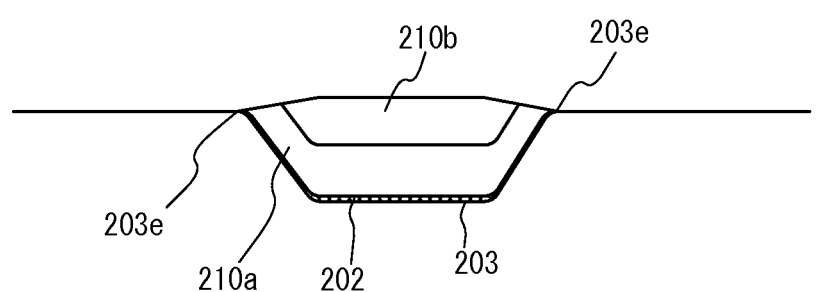
FIG. 3A and FIG. 3B are side views illustrating a conventional method for manufacturing an endless belt.
Figure 3B:
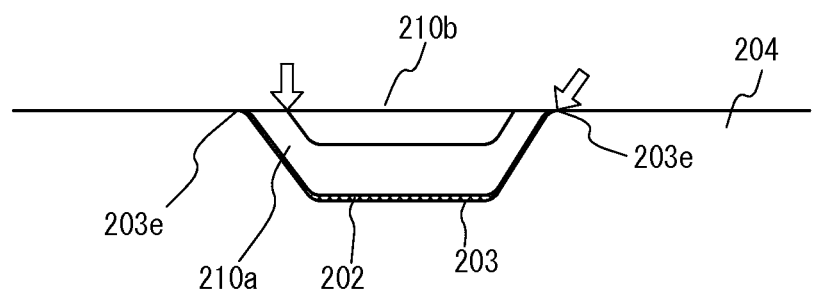

The belt longitudinal length of the upper unvulcanized rubber sheet 110b is preferably less than the belt longitudinal length of the lower unvulcanized rubber sheet 110a, as illustrated in FIG. 1D. By shortening the unvulcanized rubber sheets in the direction away from the surface rubber, the unvulcanized rubber sheets can be cut easily, and also the rubber sheets flow appropriately in the belt longitudinal direction during the vulcanization bonding step to make the belt surface after vulcanization flatter as described later. Note that, after forming the unvulcanized rubber sheets 110a and 110b in layers, the unvulcanized rubber sheets 110a and 110b may be diagonally cut with a cutter or the like to assume a trapezoidal shape, as illustrated in FIG. 1E.

After this, the upper surface of the upper unvulcanized rubber sheet 110b is pressed with a roller 300 to pressure-join the unvulcanized rubber sheets 110a and 110b, the adhesion processing material 102, and the surface rubber 104 including the depression 103.

The adhesion processing material 102, especially in the case of including unvulcanized rubber, tends to firmly attach to the unvulcanized rubber sheets 110a and 110b, but does not easily attach to the vulcanized surface rubber 104. Hence, in the conventional techniques, the following phenomenon can occur for example when the upper surface of the upper unvulcanized rubber sheet 110b is pressed with the roller as mentioned above: the adhesion processing material 102 attaches to the unvulcanized rubber sheet 110a rather than the surface rubber 104 and the unvulcanized rubber sheets 110a and 110b and the adhesion processing material 102 peel away from the surface rubber 104.

In view of this, the adhesive attachment area length B is set greater than the unvulcanized rubber sheet length A so that the adhesion processing material 102 extends off the unvulcanized rubber sheets 110a and 110b, to cause the adhesion processing material 102 to firmly attach to the surface rubber 104 at least in the extended area. This effectively prevents the unvulcanized rubber sheets 110a and 110b and the adhesion processing material 102 from peeling away from the surface rubber 104, for example when the upper surface of the upper unvulcanized rubber sheet 110b is pressed with the roller 300.

In the subsequent vulcanization bonding step, the overlapped belt longitudinal ends including the depression 103 are heated while being pressed from above and below, to vulcanize the unvulcanized rubber sheets 110a and 110b. Since the members firmly adhere to each other as mentioned above, the longitudinal ends 100a and 100b of the belt are firmly bonded to each other by vulcanization. A highly durable endless belt can be obtained in this way.

In the vulcanization bonding step, the rubber sheets heated while being pressed flow in the belt longitudinal direction. This eliminates the difference in height (irregularities) between the surface rubber 104 and the unvulcanized rubber sheets 110a and 110b before vulcanization. Here, reducing the belt longitudinal length of the unvulcanized rubber sheets in the direction away from the surface rubber as illustrated in FIG. 1D facilitates the flow of the rubber sheets in the belt longitudinal direction in the vulcanization bonding step.

If the rubber flows to an area not subjected to the adhesion improvement processing such as buffing in the vulcanization bonding step, the flown rubber may form a film on the surface rubber in the area and peel. In such a case, the external appearance deteriorates, and also there is a possibility that the peeled rubber and the like enter into articles being conveyed. A finishing operation after the vulcanization bonding step is therefore needed to buff the belt surface in order to remove the peeled rubber and the like.

Let C be the belt longitudinal distance (hereafter also referred to as the adhesion improvement processing area length) between the belt longitudinal edge 105e of the area 105 subjected to the adhesion improvement processing and the belt longitudinal edge 103e of the depression. When A is less than B and B is less than C, the adhesion improvement processing area 105 of the surface rubber 104 may be exposed immediately before vulcanization bonding. As a result, during vulcanization bonding, the rubber flowing in the belt longitudinal direction is bonded to the surface rubber 104 in the adhesion improvement processing area 105. The finishing operation after the vulcanization bonding step may thus be reduced.

Here, when A is greater than or equal to 10 millimeters and A is less than or equal to 20 millimeters, B is greater than 20 millimeters and B is less than or equal to 40 millimeters, and C is greater than 50 millimeters and C is less than or equal to 70 millimeters, the work efficiency of the endless processing may be further enhanced, and the above-mentioned effect of improving the durability of the endless belt and effect of reducing the finishing operation after the vulcanization bonding step may be further enhanced.

During the vulcanization bonding step, air which has remained in the unvulcanized rubber at the time of, for example, the formation of the unvulcanized rubber sheets tries to escape from the belt surface. To prevent such air from accumulating on the belt surface and degrading the surface property, air may be let to escape with the surface of the unvulcanized rubber sheet, e.g. the surface of the upper unvulcanized rubber sheet 110b in this embodiment, being covered with cloths or the like. Preferably, vulcanization is performed in a state where a gas-permeable heat-resistant film is attached to the surface of the unvulcanized rubber sheet. This contributes to a better surface shape after vulcanization than in the case where the surface of the unvulcanized rubber sheet is covered with cloths, and reduces any creases formed on the belt surface after vulcanization even if creases are formed.

As the gas-permeable heat-resistant film, for example, a resin such as fluororesin or polyolefin may be used as a material capable of resisting high temperatures of 200° C. at the maximum. The thickness of the gas-permeable heat-resistant film is preferably 20 micrometers to 100 micrometers, and particularly preferably 30 micrometers to 50 micrometers. When the gas-permeable heat-resistant film is excessively thin, creases tend to form on the belt surface after vulcanization. When the gas-permeable heat-resistant film is excessively thick, in the case where the surface rubber or the adhesion processing material flows outside the film attachment range during vulcanization, a difference in level tends to occur between the unvulcanized rubber and the vulcanized rubber in the film attachment range. The gas-permeable heat-resistant film that has been matted or smoothed may be used to suppress unnatural luster of the belt surface after vulcanization, thus further improving the external appearance of the belt.

REFERENCE SIGNS LIST 100 belt
100a, 100b longitudinal end of belt
101 step surface
102 adhesion processing material
102e longitudinal edge of adhesion processing material
103 depression
103e belt longitudinal edge of depression
104 surface rubber
105 area subjected to adhesion improvement processing
105e belt longitudinal edge of area subjected to adhesion improvement processing
110a, 110b unvulcanized rubber sheet
110e belt longitudinal edge of interface of unvulcanized rubber sheet and adhesion processing material
200a, 200b longitudinal end of belt
201 step surface
202 adhesion processing material
203 depression
204 surface rubber
210a, 210b rubber sheet
300 roller

The invention claimed is:

1. A method for manufacturing an endless belt comprising:
providing a belt, the belt comprising rubber surfaces and two longitudinal ends;
placing the longitudinal ends adjacent one another such that a depression is formed at a surface of the belt where the longitudinal ends meet;
applying adhesion processing material to portions of the longitudinal ends including areas which define the depression;

attaching an unvulcanized rubber sheet to portions of the longitudinal ends including the areas which define the depression, wherein a longitudinal length of the unvulcanized rubber sheet is reduced in a direction away from the rubber surface;

vulcanizing the unvulcanized rubber sheet to bond the unvulcanized rubber sheet to the surface rubber, wherein A is less than B, where A is the distance from a longitudinal end of the unvulcanized rubber sheet to a longitudinal edge of the depression, and B is the distance from a longitudinal edge of the applied adhesion processing material to the longitudinal edge of the depression.

2. The method for manufacturing the endless belt according to claim 1, comprising performing adhesion improvement processing on the longitudinal ends of the belt before the unvulcanized rubber sheet is attached, wherein A is less than B, and B is less than C, where C is a belt longitudinal distance between a belt longitudinal edge of an area subjected to the adhesion improvement processing and the belt longitudinal edge of the depression.

3. The method for manufacturing the endless belt according to claim 2, wherein A is greater than or equal to 10 millimeters and A is less than or equal to 20 millimeters, B is greater than 20 millimeters and B is less than or equal to 40 millimeters, and C is greater than 50 millimeters and C is less than or equal to 70 millimeters.

4. The method for manufacturing an endless belt according to claim 1, wherein the adhesion processing material is selected from the group consisting of rubber cement, unvulcanized adhesive rubber and unvulcanized pressure sensitive adhesive rubber.

5. The method of manufacturing an endless belt according to claim 1, wherein the rubber sheet is diagonally cut at opposite longitudinal ends before the vulcanization step.

* * * * *